(12) United States Patent
Andrew et al.

(10) Patent No.: US 6,220,086 B1
(45) Date of Patent: Apr. 24, 2001

(54) METHOD FOR ASCERTAINING SURGE PRESSURE RATIO IN COMPRESSORS FOR TURBINES

(75) Inventors: Philip Lynn Andrew, Glenville; John David Stampfli, Delmar, both of NY (US); Pierluigi Nava; Marco Mazzoni, both of Florence (IT)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/169,007

(22) Filed: Oct. 9, 1998

(51) Int. Cl.[7] ........................................... F02C 7/00
(52) U.S. Cl. ................................................ 73/118.2
(58) Field of Search ........................... 73/116, 112, 115, 73/117.2, 117.3, 118.1, 118.2, 117.4

(56) References Cited

U.S. PATENT DOCUMENTS

| | | | |
|---|---|---|---|
| 4,449,358 | * | 5/1984 | Mani . |
| 4,470,256 | * | 9/1984 | Palmer . |
| 4,483,147 | * | 11/1984 | Evans et al. . |
| 4,543,036 | * | 9/1985 | Palmer . |
| 4,606,191 | * | 8/1986 | Collins et al. . |
| 5,113,646 | | 5/1992 | Cox . |
| 5,222,356 | * | 6/1993 | Evenson et al. . |
| 5,313,779 | * | 5/1994 | Rodgers . |
| 5,385,012 | * | 1/1995 | Rowe . |
| 5,508,943 | * | 4/1996 | Batson et al. . |
| 5,794,431 | * | 8/1998 | Utamura et al. . |
| 5,892,145 | * | 4/1999 | Moon et al. .................... 73/118.2 |

OTHER PUBLICATIONS

"CTV—A New Method for Mapping a Full Scale Prototype of an Axial Compressor" Mezzedimi et al.; ASME 1996.

* cited by examiner

*Primary Examiner*—Eric S. McCall
(74) *Attorney, Agent, or Firm*—Nixon & Vanderhye

(57) ABSTRACT

The surge pressure ratio of a compressor is determined by transiently reducing the inlet flow to the compressor to increase the compressor pressure ratio sufficiently to produce the surge pressure ratio. The reduction in flow of fluid is maintained for a time period insufficient to exceed the exhaust gas temperature limit for the turbine. The area of the first-stage nozzle of the turbine is reduced and the inlet flow to the compressor is reduced to a steady state to achieve pressure ratios, in close proximity to the surge line. By transiently further reducing the inlet flow to the compressor and then increasing the inlet flow back to the steady-state condition, the surge pressure ratio can be obtained without exceeding machine operational limits.

12 Claims, 4 Drawing Sheets

METHOD FOR ASCERTAINING SURGE PRESSURE RATIO IN COMPRESSORS FOR TURBINES

TECHNICAL FIELD

The present invention relates to apparatus and methods for determining the surge pressure ratio of a compressor.

BACKGROUND OF THE INVENTION

The global market for efficient power generation equipment has been expanding in recent years and is anticipated to continue to expand in the future. The gas turbine combined cycle power plant is a preferred choice for this type of equipment due to relatively low plant investment costs and continuously improving operating efficiency of the gas turbine-based combined cycle which minimizes electricity production costs.

It is well known that elevated firing temperature in the gas turbine is a key element in providing higher output per unit mass flow, enabling increased combined cycle efficiency and that for a given firing temperature, there is an optimal cycle pressure ratio which maximizes combined cycle efficiency. The optimal cycle pressure ratio trends higher with increasing firing temperature. Compressors for these turbines are thus subjected to demands for higher levels of pressure ratio consistent with other goals, such as minimal parts count, operational simplicity and low overall cost. This optimal level of cycle pressure ratio requires improved compression efficiency in the compressor, recognizing that the compressor must perform in an aerodynamically and aeromechanically stable manner under a wide range of mass flow rates associated with varying power output characteristics of the combined cycle operation.

The maximum pressure ratio that the compressor can deliver in continuous duty is commonly defined in terms of a constant margin in pressure ratio from the surge pressure ratio line. Presently, the surge line cannot be analytically determined with certainty nor can the aeromechanical response of the blading at pressure ratios near the surge line be determined. Analytical estimates of the location of the surge line must therefore be experimentally verified through compressor testing or compressor mapping tests. As will be appreciated, compressor surge is that low frequency oscillation of flow where the flow separates from the blades and reverses flow direction through the machine, i.e., it serves as a physical limit to compressor operation at a given speed.

Full-scale mapping of a compressor including the surge line has been previously accomplished over the entire range of operating conditions of the compressor. That mapping facility included, among other things, a compressor inlet throttling system; a reduced turbine first-stage nozzle area, and compressor discharge valves for bypassing compressor discharge flow about the turbine, as well as ancillary features. In that facility, the inlet throttling system employed a valve to regulate and reduce the flow of inlet fluid to the compressor inlet. The reduction in the first-stage turbine nozzle throat area was effected from production hardware by reforming the trailing edge at different angles. These and other modifications permitted attainment of high-pressure ratios above the nominal operating line by a slow steady-state approach to the surge line without over-firing the turbine. Details of that facility are described in an article titled "CTV—A New Method for Mapping a Full Scale Prototype of an Axial Compressor," authored by Vasco Mezzedimi, Pierluigi Nava and Dave Hamilla and appearing in an ASME article published in 1996, the disclosure of which is incorporated herein by reference. In efforts to map the surge line of a further compressor, it was found using that system, however, that the reduction in first-stage turbine area was inadequate to permit attainment of surge pressure ratios before limits on exhaust temperature were encountered. That is, before the surge pressure ratio could be obtained, the maximum operational exhaust temperature for the turbine was reached and this could not be exceeded without damage to the machine.

BRIEF SUMMARY OF THE INVENTION

In accordance with the present invention, apparatus and methods have been developed to map the surge line of compressors without violating any machine operational limits, including the exhaust temperature limit. To map the surge pressure ratio without exceeding machine operational limits, the inlet valve is throttled to a steady-state point along a speed line to a pressure ratio short of, but in proximity to the surge pressure ratio. This reduction of fluid inlet to the compressor may be, for example, to approximately one-half atmosphere. While further throttling to a surge pressure ratio for that speed line via steady-state increments of the throttle valve position could not be accomplished without encountering operational limits on exhaust temperature at the gas turbine, it was found that the surge pressure ratio along a given speed line could be obtained by impulsively further closing the throttle valve, i.e., holding it transiently in a further closed position and then returning the throttle valve to its prior position. As a result, a transient increase in pressure ratio occurs approaching the surge pressure ratio without correspondingly reaching the exhaust temperature limit. That is, while the exhaust gas temperature escalates during the transient, it does not escalate sufficiently to reach the exhaust temperature limit before the surge pressure ratio or a data point very close to the surge pressure ratio is obtained. If the surge pressure ratio is not reached by this single transient operation of the throttle valve, one or more additional transient conditions are created by further decreasing inlet flow over substantially the same transient time period, thereby increasing the pressure ratio during the transient until a surge condition is reached. Between these transients, the compressor is allowed to return to a steady-state condition corresponding to the start of the transient.

While not being bound by a theory of operation, by reducing the air flow into the inlet of the compressor, the fuel/air ratio in the combustor increases, with the combustion system therefore firing hotter. When firing hotter, back pressure is applied to the compressor which increases the pressure ratio at that speed, ultimately to a surge pressure ratio. The present invention, however, accomplishes this transiently such that the turbine does not have sufficient time to respond to the higher combustion temperatures and thus does not exceed operational limits such as the exhaust gas temperature limit. It will, of course, be appreciated that the transients are separated along various speed lines so that a complete mapping of the surge line can be obtained for all speeds.

In a preferred embodiment according to the present invention, there is provided a method for determining the surge pressure ratio of a compressor of a gas turbine, comprising the steps of transiently reducing flow of fluid into the inlet of the compressor of the gas turbine to increase compressor pressure ratios sufficiently to produce a surge pressure ratio and ascertaining the surge pressure ratio.

In a further preferred embodiment according to the present invention, there is provided a method of determining the surge pressure ratio of a compressor for a turbine, comprising the steps of (a) establishing a steady-state compressor operating condition with reduced flow of fluid to the compressor inlet, (b) substantially instantaneously further reducing the flow of fluid to the compressor inlet, (c) maintaining the further reduced flow of fluid to the compressor inlet for a period of time insufficient to exceed operational limits of the compressor and sufficient to increase the compressor pressure ratio, (d) immediately subsequent to step (c), increasing the flow of fluid to the compressor inlet to reestablish the steady-state operating condition of the compressor and (e) determining whether the increased pressure ratio constitutes a surge pressure ratio.

It is a primary object of the present invention to provide apparatus and methods of establishing surge pressure ratio in a compressor without exceeding operational limits and with minimal instrumentation and costs.

DETAILED DESCRIPTION OF THE INVENTION

Figure 1:
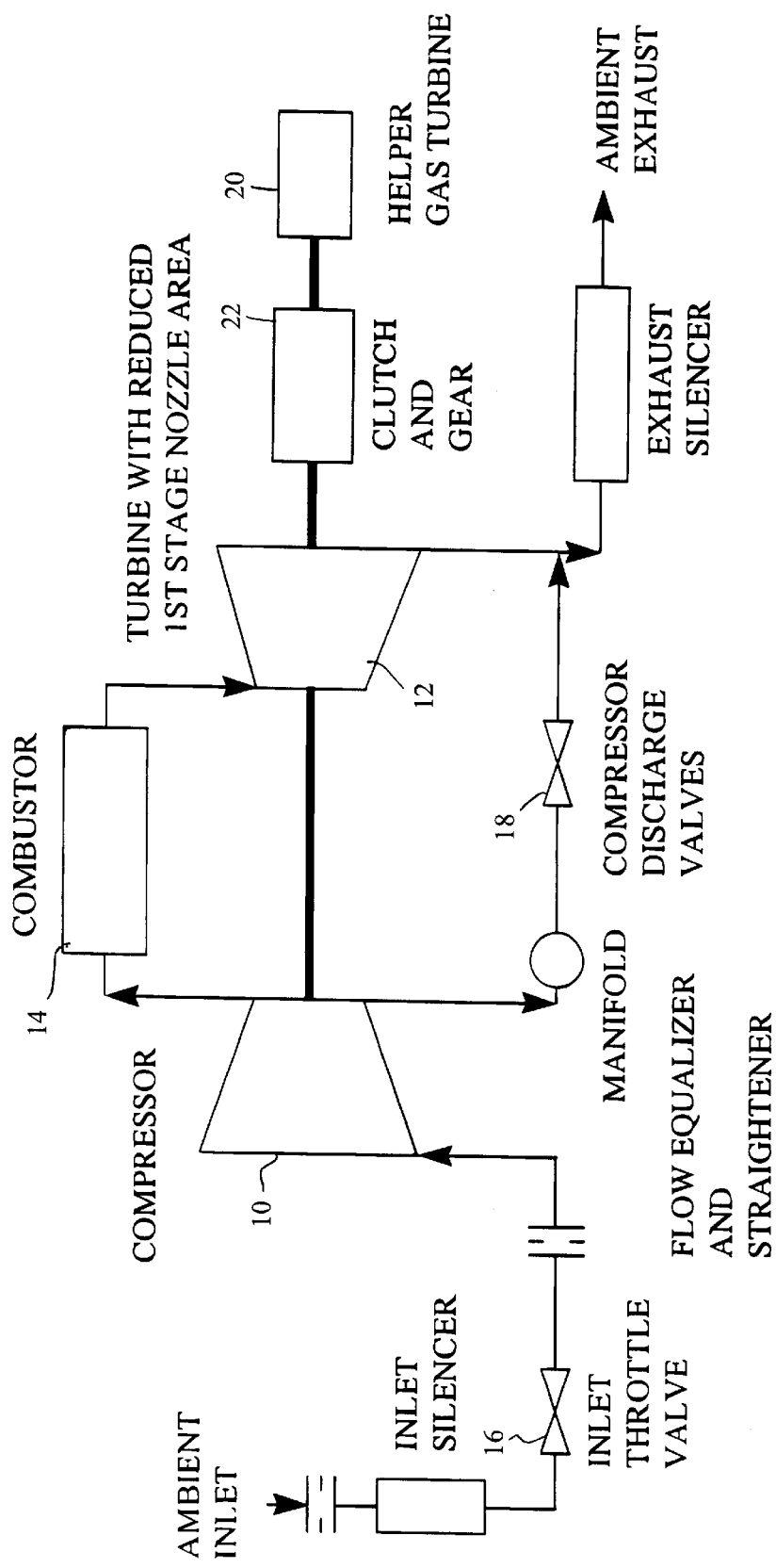
FIG. 1 is a schematic illustration of an apparatus for use in determining the surge pressure ratio in accordance with the present invention.

Referring now to FIG. 1, there is illustrated a compressor 10, a turbine 12, and a combustor 14 for the turbine, all as conventional. For purposes of full-scale mapping of the compressor including its surge line, the system illustrated in FIG. 1 is provided with an inlet throttle valve 16 and a compressor discharge valve 18 communicating compressor discharge air from the compressor to the exhaust of the turbine bypassing the turbine. An increased capacity starting means for the turbine 12 is provided in the form of a helper gas turbine 20 and a clutch-and-gear arrangement 22.

The inlet throttle valve 16 comprises a hydraulically-actuated valve for regulating the flow of inlet fluid, e.g., air, to the compressor. The compressor discharge valves 18 are employed to bypass flow around the turbine in order to map points below the nominal operating line of the turbine. Additionally, the turbine first-stage nozzle area is reduced, for example, by reshaping the trailing edge of the blades of the first stage. This enables attainment of high pressure ratios above the nominal operating line without the need for over-firing the turbine. Because of this modification, the helper gas turbine, i.e., increased start-up capacity, is provided. Reducing the turbine first-stage inlet area may not be necessary to map all compressors.

Figure 2:
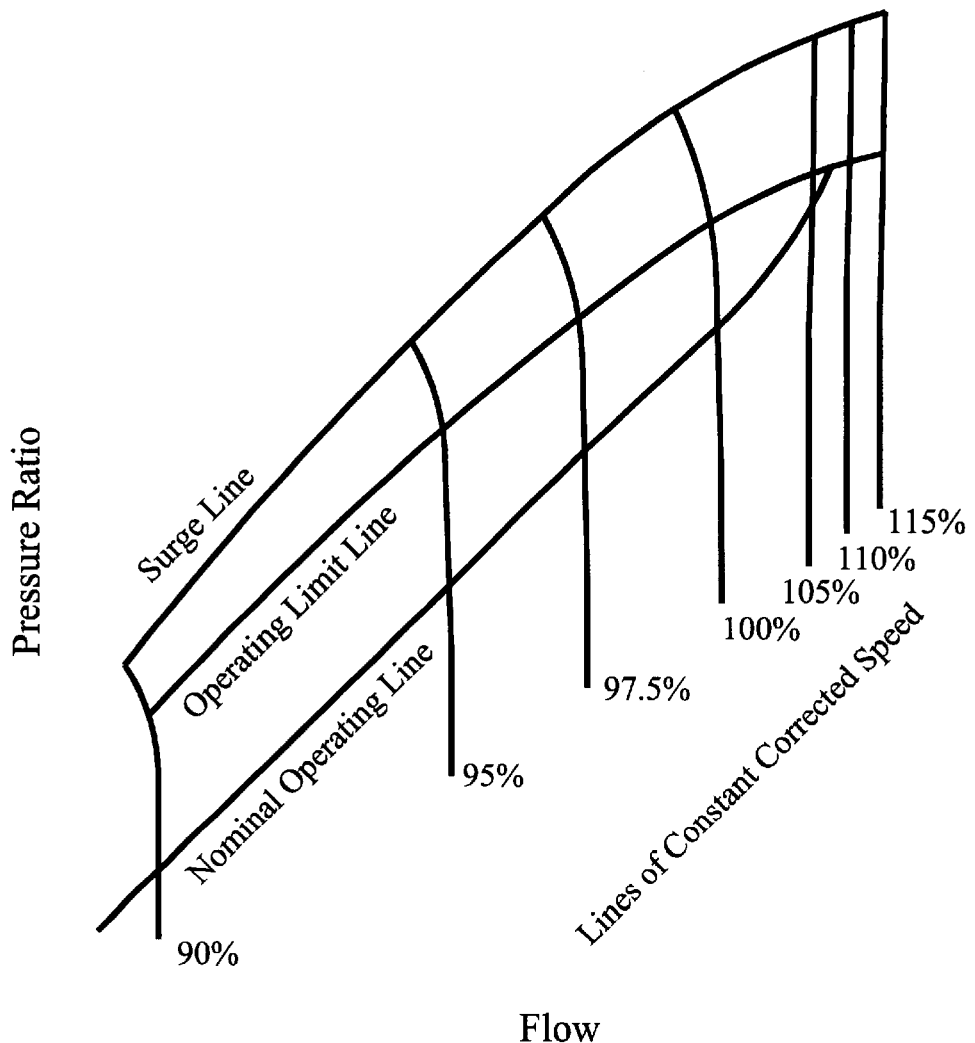
FIG. 2 is a view of a typical gas turbine compressor map illustrating pressure ratio versus flow.

Referring to FIG. 2, there is illustrated a typical gas turbine compressor map which is a plot of pressure ratio versus flow. As indicated, the nominal operating line is the operating condition at which the turbine and compressor will operate at varying speeds. The operating limit line is the line established by the operator of the gas turbine as the maximum operating limit for the compressor. The surge line or pressure ratio is that pressure ratio at which the flow separates from the blades and reverses direction, i.e., the limit of the compressor at a given speed. It will be appreciated that the operating limit line is therefore typically given as a line having a margin from the surge line at which the compressor will not operate.

To map the surge pressure ratio in accordance with the present invention, the inlet to the compressor is throttled to steady-state points along the speed lines in close proximity to the surge line using the throttle valve 16. For example, the inlet pressure may be reduced to approximately one-half of one atmosphere. This reduced pressure also decreases the inlet mass density commensurately which advantageously minimizes blade strains should a surge occur. In order to obtain surge pressure ratios along the various speed lines without reaching operational limits of the machine, e.g., exhaust gas temperature limits, the throttle valve 16 is impulsively or transiently further closed along each speed line, held in that closed position for a very short predetermined length of time and returned to substantially the same prior steady-state operating condition. For example, the throttle valve 16 may be transiently closed initially from 87% of its travel to 89% of the travel, held for two seconds and then returned to its position at 87% of travel. When the throttle valve 16 is transiently closed at a pressure ratio along the speed line close to the surge line, the increase in pressure ratio caused by the transient reduction of inlet flow may be sufficient to surge the compressor. The exhaust gas temperature also escalates during the transient pulsing but does not have sufficient time to reach the exhaust temperature limit before the throttle valve is opened back to its former position. If the transient pulse is insufficient to cause a surge pressure ratio, a further, more aggressive impulsive or transient closure is effected by decreasing the inlet flow to a greater extent over substantially the same time period. For example, the closure may be effected from an 87% to a 91% closure and then held closed over the same time period, e.g., two seconds, before returning, i.e., opening the compressor inlet to its previous value. With repeat of this procedure, the surge compressor ratio is reached without exceeding operational limits of the machine. The machine, of course is allowed to equilibrate or obtain steady-state conditions between efforts to reach surge compressor ratio.

Figure 3:
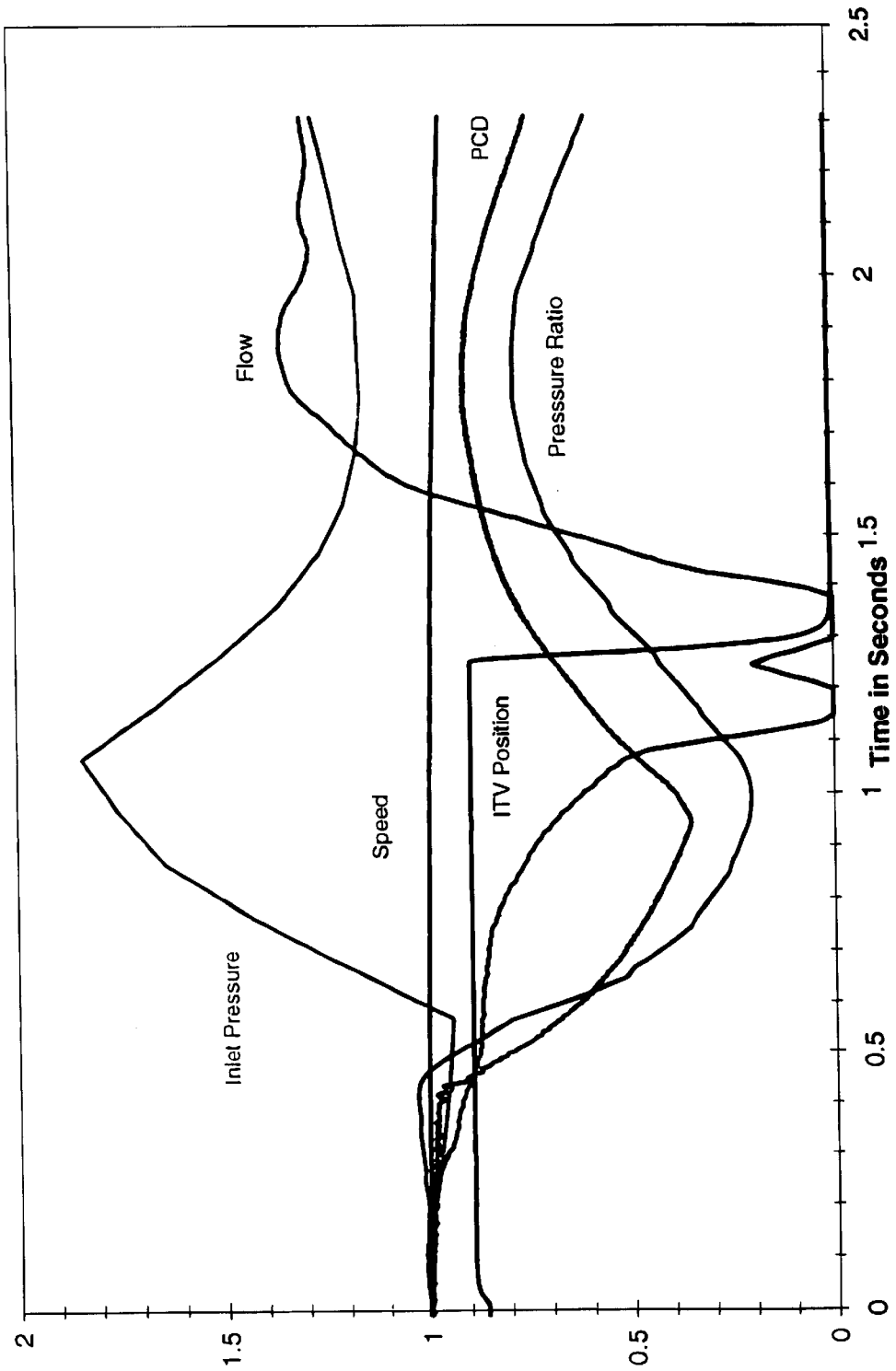
FIG. 3 is a graph illustrating various parameters of a compressor operated through a surge condition.

Referring to FIG. 3, there is illustrated a plot of various parameters, i.e., inlet pressure, speed, throttle valve position and compressor inlet and outlet pressure. In this illustrative example, the pulsation was from 86% closed to 89% closed. After the surge pressure ratio was detected by the control system, the machine automatically tripped and the throttle moved to a fully open position as indicated by the drop in the ITV position curve. At the initiation of the transient, the inlet pressure initially decreases but at a faster rate compared with the exit pressure (PCD) causing a transient increase in pressure ratio. Within the time period in which the ITV has been moved and transiently maintained to reduce the flow of fluid to the compressor inlet, the surge pressure ratio is initiated in the aft stages of the compressor. This back pressures the inlet, causing the inlet pressure to rise and the inlet flow to decrease. The flow reverses at about the same time as the unit trips as indicated in the graph of FIG. 3.

Figure 4:
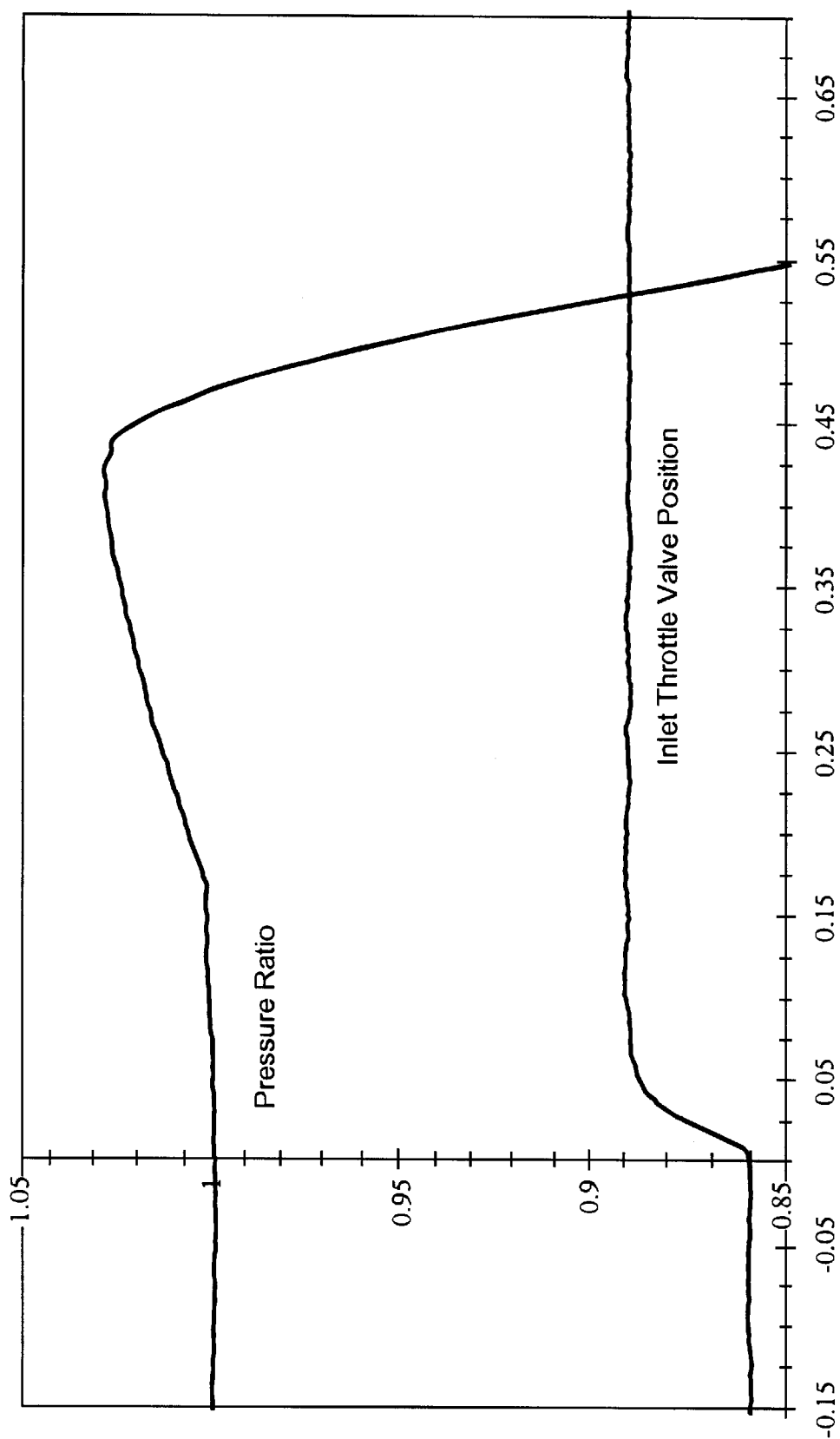
FIG. 4 is an enlargement of the pressure ratio and inlet throttle valve positions illustrated in FIG. 3 on an enlarged scale.

In FIG. 4, the left-hand portion of the FIG. 3 graph is illustrated. FIG. 4 shows the initial variation of pressure ratio during the surge on an expanded scale and on which the maximum increase in pressure ratio can be quantified. This is a commercially significant increase in demonstrated surge pressure ratio capability relative to that demonstrable through steady-state throttling.

For mapping compressor performance over the entire range of operating conditions of flow, speed, pressure ratio and efficiency, flow bypassing the turbine is provided by the compressor discharge valves. By diverting the compressor discharge flow, the mapping can go forward along speed lines below the nominal operating line. It will also be appreciated that the detection of the surge pressure ratios and other compressor performance characteristics may be accomplished by conventional means known to those of skill in this art.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for determining a surge pressure ratio of a compressor of a gas turbine, the compressor having an inlet, comprising the steps of:

transiently reducing flow of fluid into the inlet of the compressor of the gas turbine to increase compressor pressure ratios sufficiently to produce a surge pressure ratio; and ascertaining the surge pressure ratio.

2. A method according to claim 1 including periodically transiently reducing the flow of fluid into the compressor inlet of the gas turbine at increasingly reduced magnitudes to determine the compressor surge pressure ratio.

3. A method according to claim 2 including periodically transiently reducing the flow of fluid into the compressor inlet of the gas turbine at constant speed to determine the compressor surge pressure ratio.

4. A method according to claim 2 including periodically transiently reducing the flow of fluid into the compressor inlet at different constant speeds to establish a line of surge pressure ratios for said different constant speeds.

5. A method according to claim 4 including mapping the speed lines of the compressor to pressure ratios to establish a surge pressure ratio line.

6. A method according to claim 1 wherein the step of transiently reducing includes reducing the flow of fluid from a steady-state operating condition for a time period insufficient to exceed exhaust gas temperature limits and increasing the flow of fluid substantially back to the flow for the steady-state operating condition.

7. A method of determining a surge pressure ratio of a compressor for a turbine, the compressor having an inlet, comprising the steps of:

(a) establishing a steady-state compressor operating condition with reduced flow of fluid to the compressor inlet;

(b) substantially instantaneously further reducing the flow of fluid to the compressor inlet;

(c) maintaining the further reduced flow of fluid to the compressor inlet for a period of time insufficient to exceed operational limits of the compressor and sufficient to increase the compressor pressure ratio;

(d) immediately subsequent to step (c), increasing the flow of fluid to the compressor inlet to reestablish the steady-state operating condition of the compressor; and (e) determining whether the increased pressure ratio constitutes a surge pressure ratio.

8. A method according to claim 7 including repeating steps (b)–(e) with the magnitude of the reduction in flow of step (c) being increased.

9. A method according to claim 7 wherein the period of time of step (c) is insufficient to exceed an exhaust gas temperature limit for the turbine.

10. A method according to claim 9 wherein the period of time of step (c) is approximately two seconds.

11. A method according to claim 1 including mapping speed lines of the compressor to pressure ratios and bypassing a portion of compressor discharge air around the turbine, enabling the mapping below a nominal operating line of the turbine.

12. A method according to claim 1 wherein the step of reducing the flow is accomplished by a throttle valve, including driving the turbine by a helper turbine connected to the first mentioned turbine to compensate for pressure drop across the throttle valve that is not available for expansion across the power turbine to drive the compressor to elevated pressure ratios near surge.

* * * * *